US012473982B2

(12) United States Patent
Manternach et al.

(10) Patent No.: US 12,473,982 B2
(45) Date of Patent: Nov. 18, 2025

(54) GUIDE ASSEMBLY FOR VALVE

(71) Applicant: Mueller International, LLC, Atlanta, GA (US)

(72) Inventors: Eric Joseph Manternach, Chattanooga, TN (US); Conner Scott Holmes, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 4 days.

(21) Appl. No.: 18/140,547

(22) Filed: Apr. 27, 2023

(65) Prior Publication Data
US 2024/0360905 A1    Oct. 31, 2024

(51) Int. Cl.
*F16K 27/04*    (2006.01)
*F16K 3/314*    (2006.01)
*F16K 3/316*    (2006.01)

(52) U.S. Cl.
CPC .............. *F16K 3/316* (2013.01); *F16K 3/314* (2013.01); *F16K 27/044* (2013.01)

(58) Field of Classification Search
None
See application file for complete search history.

(56) References Cited

U.S. PATENT DOCUMENTS

| | | | | |
|---|---|---|---|---|
| 3,504,886 A | * | 4/1970 | Hulslander | F16K 5/0278 251/328 |
| 4,429,710 A | * | 2/1984 | Grieves | F16K 3/02 251/285 |
| 4,671,313 A | | 6/1987 | Houston | |
| 5,521,000 A | * | 5/1996 | Owens | F01L 3/205 123/73 V |
| 5,653,423 A | * | 8/1997 | Young | F16K 3/0281 251/360 |
| 6,375,157 B1 | * | 4/2002 | Van de Lande | F16K 27/044 251/327 |
| 7,350,766 B2 | * | 4/2008 | Comstock | F16K 3/0227 251/328 |
| 7,815,170 B2 | * | 10/2010 | Devine, Jr. | F16K 27/044 251/328 |
| 10,054,238 B2 | * | 8/2018 | Watterodt | F16K 3/0281 |
| 2024/0360906 A1 | | 10/2024 | Holmes et al. | |

OTHER PUBLICATIONS

Holmes, Conner Scott; Non-Final Office Action for U.S. Appl. No. 18/140,552, filed Apr. 27, 2023, mailed Oct. 1, 2025, 19 pgs.

* cited by examiner

*Primary Examiner* — Matthew W Jellett
(74) *Attorney, Agent, or Firm* — Taylor Duma LLP

(57) ABSTRACT

A valve comprising a valve body and a gate. The valve body defines a valve port and a guide channel. The gate is configured to slide along the guide channel between an open and closed configuration. A guide assembly within the guide channel of the valve comprises a track mounted in the guide channel, a gap defined between the guide channel and the track, a barrier covering the gap, and a cured adhesive within the gap.

8 Claims, 14 Drawing Sheets

GUIDE ASSEMBLY FOR VALVE

TECHNICAL FIELD

This disclosure relates to valves. More specifically, this disclosure relates to a guide track alignment system to guide a gate valve into a valve seat.

BACKGROUND

Gate valves can be used in fluid utility lines. A gate valve comprises a gate that is located within the valve and is slidably moved into or out of a valve port to open or close the valve. This movement either permits or obstructs fluid passage through a valve port from an inlet to an outlet of the valve. A threaded stem can be rotated to move the gate out of or into the flow stream of the valve port and to open or close the valve. When the gate is moved into the flow stream, the edges of the gate form a fluid-tight seal in a seat to prevent fluid from traversing the valve. In large water utility lines, significant pressures can be generated. These pressures can increase the torque or force required to open and/or close the valve and can cause fluid leakage through the seal formed at the seat and/or edges of the gate.

SUMMARY

It is to be understood that this summary is a limited overview of the disclosure and is not extensive. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, a valve is disclosed comprising a valve body, a gate, a guide, and a cured adhesive within a gap. The valve body can define a valve port and a guide channel. The gate can be configured to slide along the guide channel between an open configuration and a closed configuration. The guide assembly can comprise a track, a barrier, and the cured adhesive. The track can be mounted in the guide channel and can define the gap between the guide channel and the track. The barrier can cover the gap. The cured adhesive can be within the gap.

In a further aspect, disclosed is a method for manufacturing a gate valve. The method comprises fitting a track within a guide channel of a valve body of a gate valve. The guide channel and the track can define a gap between the track and the guide channel. A barrier that covers the gap between the guide channel and the track can be created. A curable adhesive can be inserted or injected within the gap so that the curable adhesive is captured within the gap by the barrier.

In yet another aspect, disclosed is a method of aligning a track in a wettable surface of a valve. The method comprises inserting the track into a guide of the valve to form a gap between the track and the guide. A barrier can be formed in the gap with an adhesive bonded on a barrier structure. The gap can be filled between the track, the guide, and the barrier.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

Fluid utility lines can use a gate valve where a gate is located and slidably translated within the valve to move into or out of the valve port and open or close the valve. When the gate is moved into the flow stream, a guide can be used to capture the gate against the pressure of fluid flowing through a valve port. When fully closed, the gate edges form a fluid-tight seal in a seat to prevent fluid from traversing the valve. However, when the gate is partially open or partially closed, the fluid flowing through the valve port can increase the torque or force needed to open or close the gate within the valve. Large water utility lines, e.g., of a 50-70-inch diameter pipe, can generate significant pressure as the gate is introduced and moved through the fluid flow. This pressure can generate a normal force on the gate that increases the friction and/or increases the torque needed to open and/or close the valve.

Figure 1:
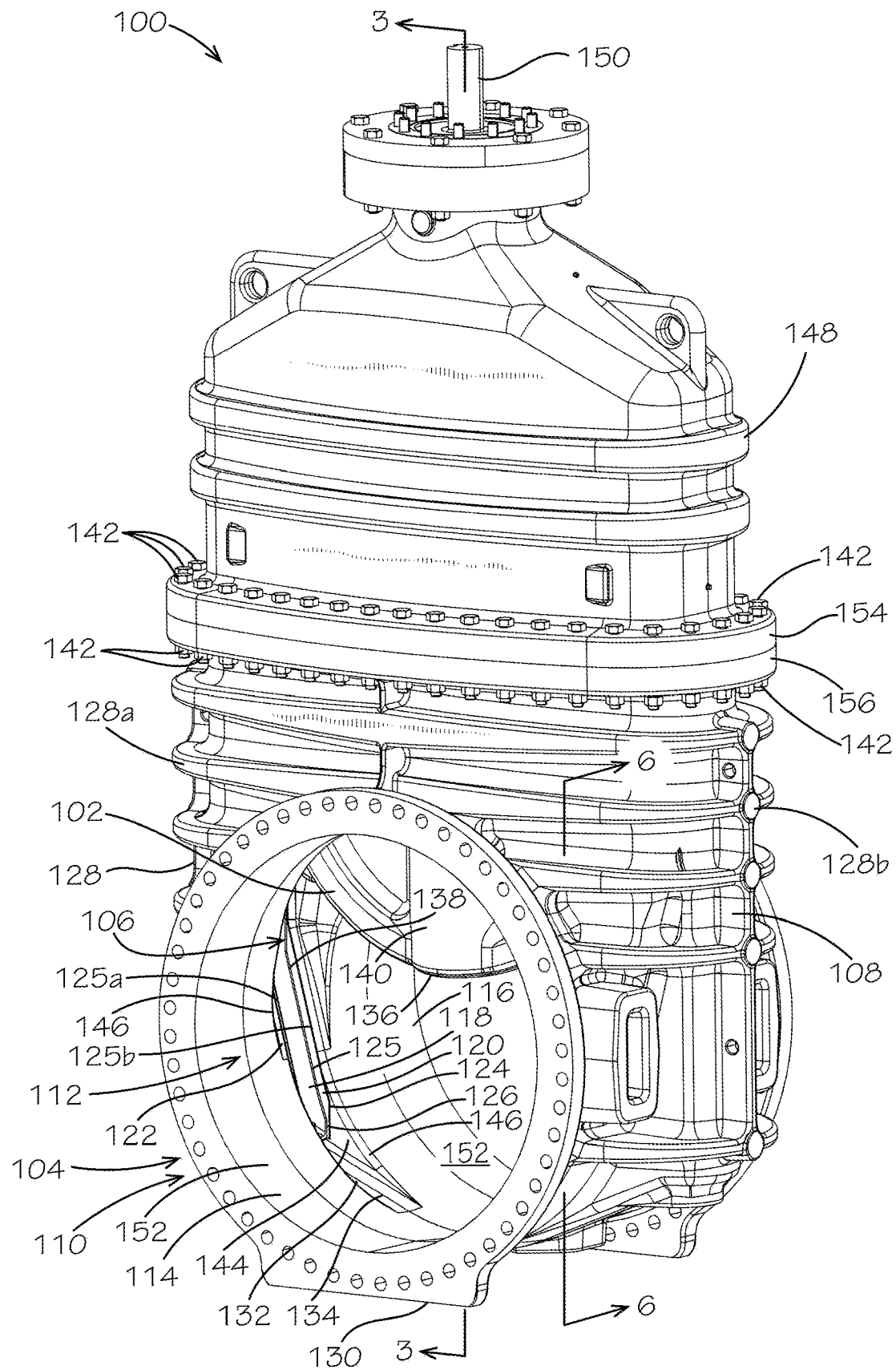
FIG. 1 is a perspective view of a gate valve showing a gate in an open position in accordance with one aspect of the current disclosure.
Figure 2:
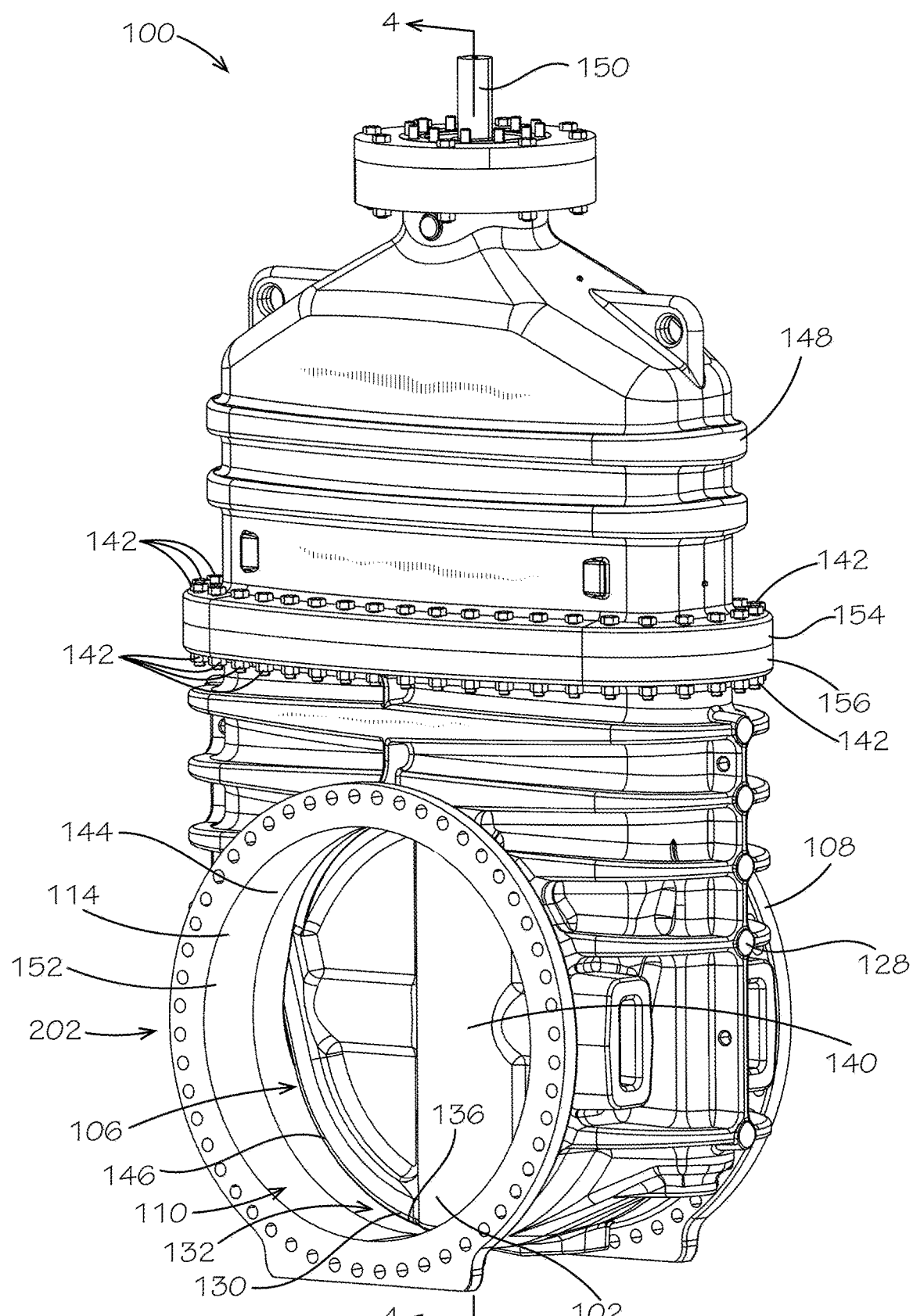
FIG. 2 is a perspective view of the gate valve of FIG. 1, showing the gate in a closed position.

FIG. 1 illustrates a gate valve or other valve 100 comprising a gate 102 in the open position or open configuration 104. FIG. 2 shows the valve 100 with the gate 102 translated into a closed position or closed configuration 202 to obstruct fluid flow. The description of each valve herein applies to valve 100, and reference numbers for valve 100 may be used in reference to any valve in FIGS. 1-11.

Gate 102 is configured to slide along (e.g., translate back and forth along) a guide channel 106 between the open configuration 104 (FIG. 1) and the closed configuration 202 (FIG. 2). Valve 100 comprises a valve body 108 defining a valve port 110 and the guide channel 106. The valve port 110 comprises a flow channel 112 that permits fluid to flow through the valve port 110 in the open configuration 104. The flow channel 112 extends through the valve body 108 of valve 100. When the gate 102 is in the open configuration 104 the flow channel 112 is open between an inlet 114 and an outlet 116. That is, when the gate 102 is in the open configuration 104 fluid can flow through the valve port 110 from the inlet 114 to the outlet 116. Similarly, when the gate 102 is in the closed configuration 202, the flow channel 112 is closed between the inlet 114 and the outlet 116 and sealed to obstruct or prevent fluid from flowing through the flow channel 112.

Valve 100 comprises gate 102 installed within a guide assembly 118. Guide assembly 118 comprises a track 120, a barrier 122, and a cured resin or adhesive 124 within a gap 126 defined between the guide channel 106 of the valve body 108 and the track 120 of the guide assembly 118. Gap 126 defines a width between the guide channel 106 of the valve body 108 and the guide assembly 118. In various aspects, the width of the gap 126 can be between about ¼ inches and ½ inches, and in a specific example aspect, the gap 126 can have a width between the guide assembly 118 and the guide channel 106 of approximately 5/16 inches. In other aspects, the width of the gap 126 can be less than ¼ inches or more than ½ inches, or any other width as desired.

In some aspects, guide assembly 118 can further comprise an adjustment plate 702 and/or a base plate 704 (see FIGS. 7 and 8) installed within the track 120. The track 120 can mount within the guide channel 106 of the valve body 108 and form the gap 126 or a small space defined between guide channel 106 and track 120. The gap 126 can facilitate adjustment of the track 120 and/or alignment of the track 120 relative to the gate 102 to facilitate smooth translation of the gate 102 through the guide assembly 118. Proper alignment of the gate 102 within the track 120 can also reduce frictional resistance on the gate 102 as it translates through the guide assembly 118 between the open configuration 104 and the closed configuration 202.

Guide assembly 118 can adjustably be installed within the guide channel 106 of the valve body 108 with the barrier 122 used to cover and facilitate filling the gap 126. Once the barrier 122 is in place, the liquid or uncured adhesive 124 can be inserted and/or injected into the gap 126. Once the adhesive 124 is properly inserted into the gap 126 and captured by the barrier 122, the adhesive 124 can be cured into the cured adhesive 124. The cured adhesive 124 within the gap 126 can create a structural, fluid-tight seal with the valve body 108. That is, the cured adhesive 124 creates a structural support that holds the guide assembly 118. The guide channel 106 can extend along both opposed lateral sides 128a,b (e.g., along vertical sides) of the valve body 108 and can further extend across a transverse side 130 that extends between the lateral sides 128a,b (e.g., along a horizontal bottom of the valve 100). The transverse side 130 can comprise a base seat 132 that forms a seal along a base 134 of the valve body 108. Valve 100 can be installed vertically, horizontally, or in an angled configuration, such that the lateral sides 128 and/or the transverse side 130 can be oriented along the horizontal, vertical, or another axis. However, the lateral sides 128 (e.g., in a vertical/horizontal orientation) are generally oriented to be perpendicular to the transverse side 130 (e.g., oriented in the horizontal/vertical orientation, respectively).

Guide assembly 118 can include a pair of opposed flanges 125, such as a first flange 125a and a second flange 125b. The opposed flanges 125 extend in a direction that is substantially perpendicular to the flow channel 112. That is, the opposed flanged 125 serve to capture a portion of gate 102 and secure the gate 102 in the guide channel 106 of the valve body 108 within the opposed flanges 125a,b.

Each lateral side 128a,b can comprise guide assembly 118 configured to support the gate 102 as it moves between the open configuration 104 and the closed configuration 202. The transverse side 130 can seal with a base edge 136 of the gate 102 within the valve body 108 in the closed configuration 202. The base seat 132 can be installed or defined in the base 134 of the valve body 108 and/or within the guide channel 106, extending along the base 134 of the valve body 108. For example, the base seat 132 can be a portion of the transverse side 130 that engages the gate 102, (e.g., a lower edge of gate 102). The base seat 132 and/or guide assembly 118 can be configured to receive the gate 102 in the closed configuration 202 and obstruct fluid flow through the valve port 110 by forming a fluid-tight seal.

The guide assembly 118 can comprise the track 120 installed within the guide channel 106 of the valve body 108 and aligned within the gap 126. The barrier 122 can cover the gap 126 to prevent uncured adhesive 124 from flowing out of the gap 126 during the curing process. The barrier 122 can be coated with adhesive 124 along its exterior. The adjustment of track 120 facilitates the translation or movement of the gate 102 between the open configuration 104 and the closed configuration 202 and vice versa. The track 120 can at least partially define the gap 126 between the guide assembly 118 and the track 120. In some aspects, the barrier 122, which can be a lattice mesh in the present aspect, can be disposed within the gap 126. The adhesive 124, such as an epoxy or a resin, can be cured on the barrier 122 to form a temporary boundary 138 that retains additional liquid adhesive 124 in the gap 126 and captured between the temporary boundary 138, the guide assembly 118, and the track 120. Once the liquid adhesive 124 is installed (e.g., injected into gap 126), the adhesive 124 can be cured to form a cured adhesive 124 to seal the gate 102 within the gap 126 in the closed configuration 202.

In one aspect, the gate valve 100 that can comprise gate 102 slidably coupled to guide assembly 118 of the valve 100 along the adjustable track 120 is disclosed with associated methods, systems, devices, and various apparatuses. The gate 102 can be a solid wedge or can be a composite part or portion comprising an encapsulated disc or plate 140 encapsulated in rubber and coupled with a central shaft (shown as stem 150). In one aspect, the translation or movement of the gate 102 through or along the guide assembly 118 can comprise adjustment and/or specific modification by creating the temporary boundary 138 with the barrier 122 and/or adhesive 124 that is later backfilled with uncured adhesive 124. The uncured adhesive 124 can be captured by the temporary boundary 138 and cured to securely couple the track 120 to the guide assembly 118 within the guide channel 106. This method can accommodate field installations and/or modifications and adjustments to the track 120 alignment in the field to adjust for the specific configuration of the installation. The uncured adhesive 124, which can be malleable, can be adjusted before curing to ensure that gate 102 properly fits within and seals against the track 120 and guide assembly 118 of valve 100. Moreover, as will be discussed in detail below, the adhesive 124 can be a composite comprising two or more components. For example, and without limitation or disclaimer, the first component of the malleable adhesive 124 can comprise a putty, such as a plumber's putty, and the second component of the adhesive 124 can comprise a cured epoxy. The putty can provide sealing attributes, and the cured epoxy can provide structural rigidity to the seal between the gate 102 and the guide assembly 118. In the above example, the epoxy can be placed and cured to attain its structural rigidity prior to the application of the putty.

The guide assembly 118 can comprise a pair of opposed guide assemblies 118 and/or tracks 120 on either side of the valve body 108 along an inner surface 144 of the valve body 108. Coupling each of the pair of opposed guide assemblies 118 to the valve body 108 can facilitate adjustment of each guide assembly 118 relative to gate 102 to account for sliding movements or translations of the gate 102 through the guide assembly 118. In some aspects, epoxy or adhesive 124 can couple the opposed guide assemblies 118 to the valve body 108. When adhesive 124 is used, the uncured adhesive 124 in the gap 126 of each guide assembly 118 should be retained in the correct location relative to the valve body 108 during the curing process. Proper retention of the curing adhesive 124 ensures proper placement of the guide assembly 118 (e.g., relative the gate 102, valve body 108, and/or guide channel 106) within the gap 126 to support the translation movement of the gate 102 through the guide assembly 118. The proper retention of the adhesive 124 during the curing process can affect the strength of the joint 1000 (FIG. 10), the seal, and the proper support that the track 120 provides to the gate 102 when translating, e.g., between an open configuration 104 and a closed configuration 202 (FIG. 2). Accordingly, the barrier 122 serves to retain the adhesive 124 during the curing process to ensure a proper seal that provides adequate support to the gate 102 and the guide assembly 118 within the guide channel 106.

The uncured adhesive 124 can be a liquid with a viscosity (e.g., reduced, little, inviscid, newtonion, or non newtonian resistance to an applied shear force). The adhesive 124 can cure into a solid that can support and/or resist shear forces and/or pressure loads. The barrier 122 can help maintain the uncured liquid adhesive 124 within the gap 126 and along a perimeter 146 of the valve body 108 within the guide channel 106 during the curing process. Thus, the adhesive 124 can be molded, formed, cured, and then seal any variations in the gap 126. For example, by curing the lattice mesh barrier 122 before the uncured adhesive 124 is poured or injected into the gap 126 behind the track 120, the lattice mesh barrier 122 can serve to retain the liquid uncured adhesive 124 in the desired form of the custom seal in the gap 126 between the guide assembly 118 and the guide channel 106. The barrier 122 can retain the uncured adhesive 124 adjacent to the guide assembly 118 within the guide channel 106 while the adhesive 124 is cured to fix and seal the track 120 in the proper location and orientation within the guide channel 106 to ensure that the gate 102 properly seals the flow channel 112. The adhesive 124 can enhance the installation and adjustment of the track 120 within the guide channel 106 and can facilitate the proper sealing and track 120 alignment of the gate 102 within the guide channel 106.

FIGS. 1 and 2 show that a pressurized sealed bonnet 148 can capture the stem 150 coupled to the gate 102. In the current aspect, the bonnet 148 can be coupled to the valve body 108 by a plurality of fasteners 142 coupling a mounting flange 154 of the bonnet 148 to a mounting flange 156 of the valve body 108. The pressurize sealed bonnet 148 can be configured to maintain a fluid-tight seal between the gate 102, the valve body 108, and/or the bonnet 148 to protect the stem 150 even when the valve body 108 and/or gate 102 are subjected to high pressure, such as when the gate 102 is in the closed configuration 202, as shown in FIG. 2.

A wettable surface 152 of the valve port 110 can be defined between the inlet 114 and the outlet 116. The wettable surface 152 can be any part of the valve port 110 (comprising, e.g., the guide channel 106 within the valve body 108 and/or the guide assembly 118) that is wetted by a fluid, in either the open configuration 104 or the closed configuration 202. For example, one difference between the open configuration 104 and the closed configuration 202 is that wettable surfaces 152 of the outlet 116 are wetted in the open configuration 104 the fluid traversing the fluid channel 112, but the wettable surfaces 152 of the outlet 116 are not wetted in the closed configuration 202. In both the open configuration 104 and the closed configuration, the inlet 114 has wettable surfaces 152 that are wetting when valve 100 is in operational service.

In various aspects, the barrier 122 can be layered with the uncured adhesive 124 to prevent the barrier 122 from protruding into the wettable surface 152 of the valve port 110. For example, the barrier 122 can be linen or lattice. In a specific example, the barrier 122 can be a stainless-steel wire mesh lattice that is coated or painted with uncured adhesive 124. At each the inlet 114 and the outlet 116 sides, the barrier 122 covers the gap 126 and is cured. The wettable surface 152 of the barrier 122 in the gap 126 (e.g., at both the inlet 114 and the outlet 116) that extend into the fluid flow channel 112 can be painted and/or covered with uncured adhesive 124, so that the cured adhesive protects the barrier 122 (e.g., a wire lattice mesh) from corrosion by the fluid (e.g., water) in the valve port 110.

FIG. 2 shows valve 100 with gate 102 in the closed configuration 202. As previously noted, valve 100 can be the same or similar to valve 100 in the open configuration. Concerning FIGS. 1 and 2, the temporary boundary 138 can be formed by inserting barrier 122 into gap 126 and painting adhesive 124 on or over the barrier 122 and allowing the adhesive 124 to cure. Once adhesive 124 is cured it forms the temporary boundary 138. Then, more uncured liquid adhesive 124 can be added (e.g., injected or inserted) into the gap 126 to fill the space between the guide assembly 118, the barrier 122, and the guide channel 106 of the valve body 108. The adhesive 124 can be an epoxy or resin that can be cured to couple the track 120 within the guide assembly 118. The uncured adhesive 124 can be adjusted to ensure a proper fit of the gate 102 within the guide assembly 118. This can also reduce friction forces generated on the gate 102 when it is moved from the open configuration 104 to the closed configuration 202, and vice versa. For example, the uncured adhesive 124 can adjust to variations in the construction of the valve body 108, installation-specific requirements, and/or the installation of the gate 102 and/or track 120 within the guide assembly 118.

In some aspects, the adhesive 124 can be epoxy that can be painted onto or applied to the barrier 122, which can be a wire mesh in some aspects. The adhesive 124 can be cured to form the temporary boundary 138 and provide a barrier to capture the second stage of liquid adhesive 124 or epoxy introduced into the gap 126 between the guide assembly 118, the temporary boundary 138, and the track 120 to securely position and couple the track 120 to the guide assembly 118. In other words, the application of the adhesive 124 can occur in two separate stages to improve the placement of the track 120 and ensure the proper placement of the liquid adhesive 124 before curing. Specifically, the first stage can involve using a small amount of epoxy or adhesive 124 to prepare the track 120 and the temporary boundary 138 into an assembly that accepts the remainder of the adhesive 124 in the second stage. The adhesive 124 can be painted onto barrier 122 and then cured to form the temporary boundary 138. The adhesive 124 can be applied under positive pressure and/or vacuum pressure to draw the liquid adhesive 124 into various parts of the gap 126 and/or control the placement of the track 120 relative to the guide assembly 118.

Figure 3:
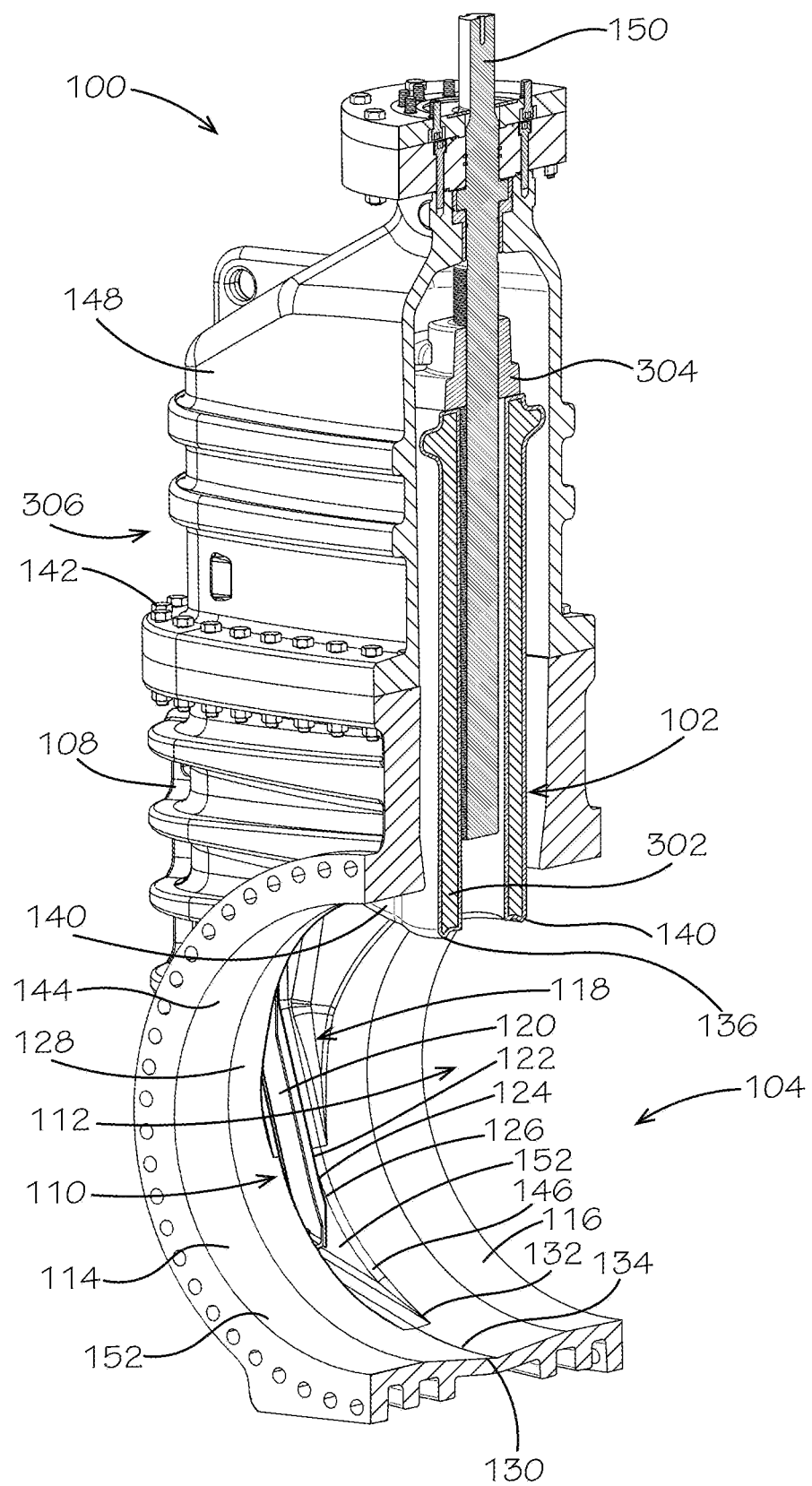
FIG. 3 is a cross-sectional perspective view of the gate valve in the open position taken along line 3-3 of FIG. 1.
Figure 4:
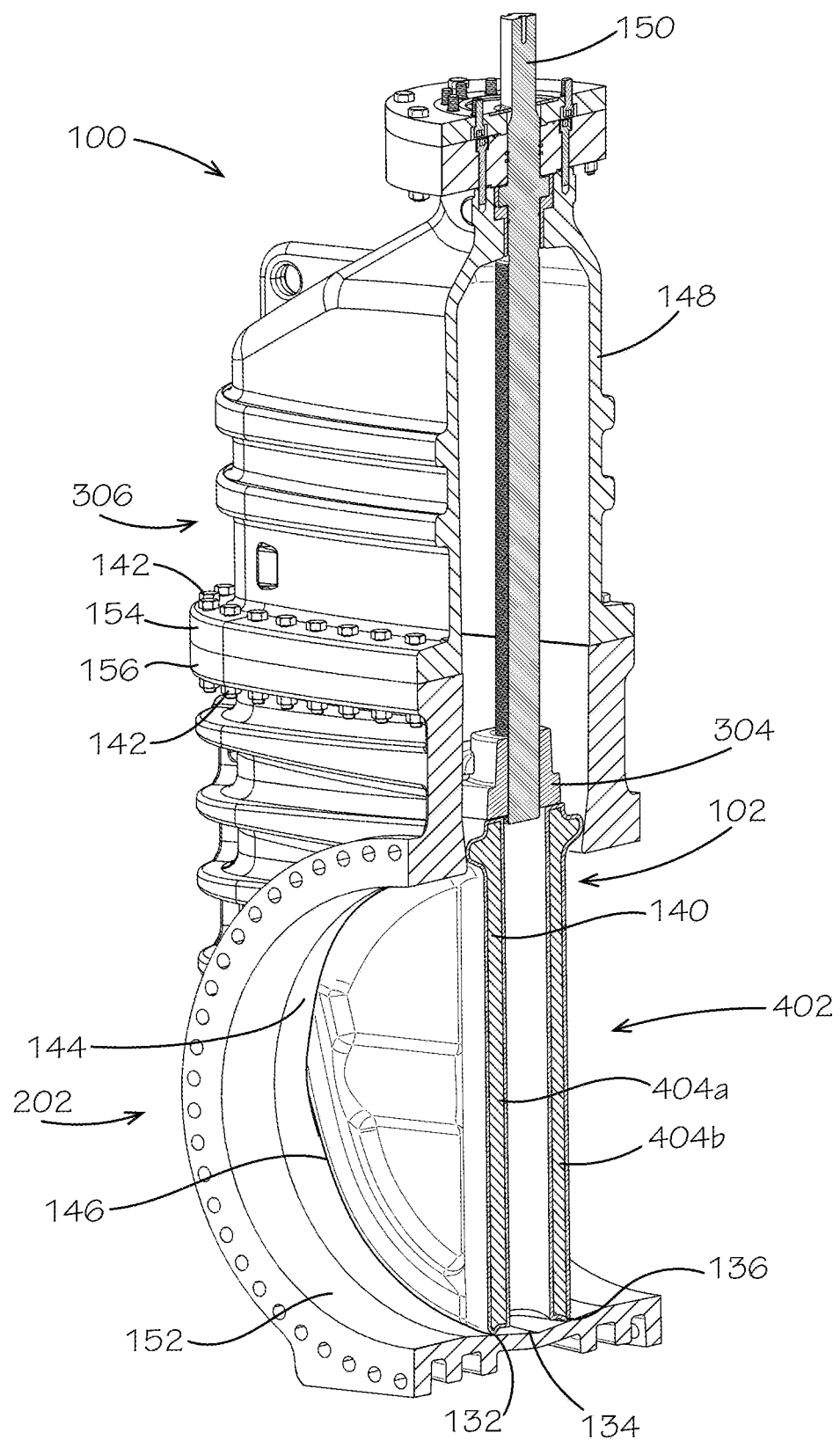
FIG. 4 is a cross-sectional perspective view of the gate valve in the closed position taken along line 4-4 of FIG. 2.

FIG. 3 is a cross-section of valve 100 in the open configuration 104 taken along line 3-3 of FIG. 1, and FIG. 4 is a cross-section view of the valve 100 in the closed configuration 202 taken along line 4-4 of FIG. 2. The fasteners 142 couple the mounting flange 154 of the bonnet 148 to the mounting flange 156 of the valve body 108. Concerning FIGS. 3 and 4, gate 102 can be an encapsulated disc comprising rigid cast iron interior plate 140 that form a disc 404 coupled to a receiver 304. The disc 404 and/or plate 140 have a rigid cast iron interior and a flexible, water-impervious outer shell (e.g., rubber, plastic, or hydrophobic material). Although gate 102 can include different materials or combinations of materials in various embodiments, some exemplary materials used in various embodiments of gate 102 can comprise steel, stainless steel, metals and metal alloys, carbon fiber reinforced plastic (CFRP), fiberglass, composites, wood, plastics, etc. The material of gate 102 should not be considered limiting. Gate 102 can be a solid wedge 302 (e.g., a cast wedge) encapsulated with rubber supported by a stem 150. The wedge 402 can comprise a disc 404 that is encapsulated in rubber. The stem 150 can couple to a pressurized bonnet 148 that captures stem 150. The stem 150 can extend through the bonnet 148 and be coupled to the gate 102, such as by the receiver 304, to facilitate transversely moving or sliding the gate 102 back and forth between the open configuration 104 and the closed configuration 202, and vice versa. In some aspects, the receiver 304 can be internally threaded and the stem 150 can be externally threaded, and rotation of the stem 150 can translate the received 304, and thereby the gate 102, back and forth between the open configuration 104 and the closed configuration 202. The pressurized bonnet 148 can support the stem 150 and/or gate 102 in high-pressure flow streams to support and/or maintain a fluid-tight seal about guide assembly 118 and/or base seat 132.

Figure 5:
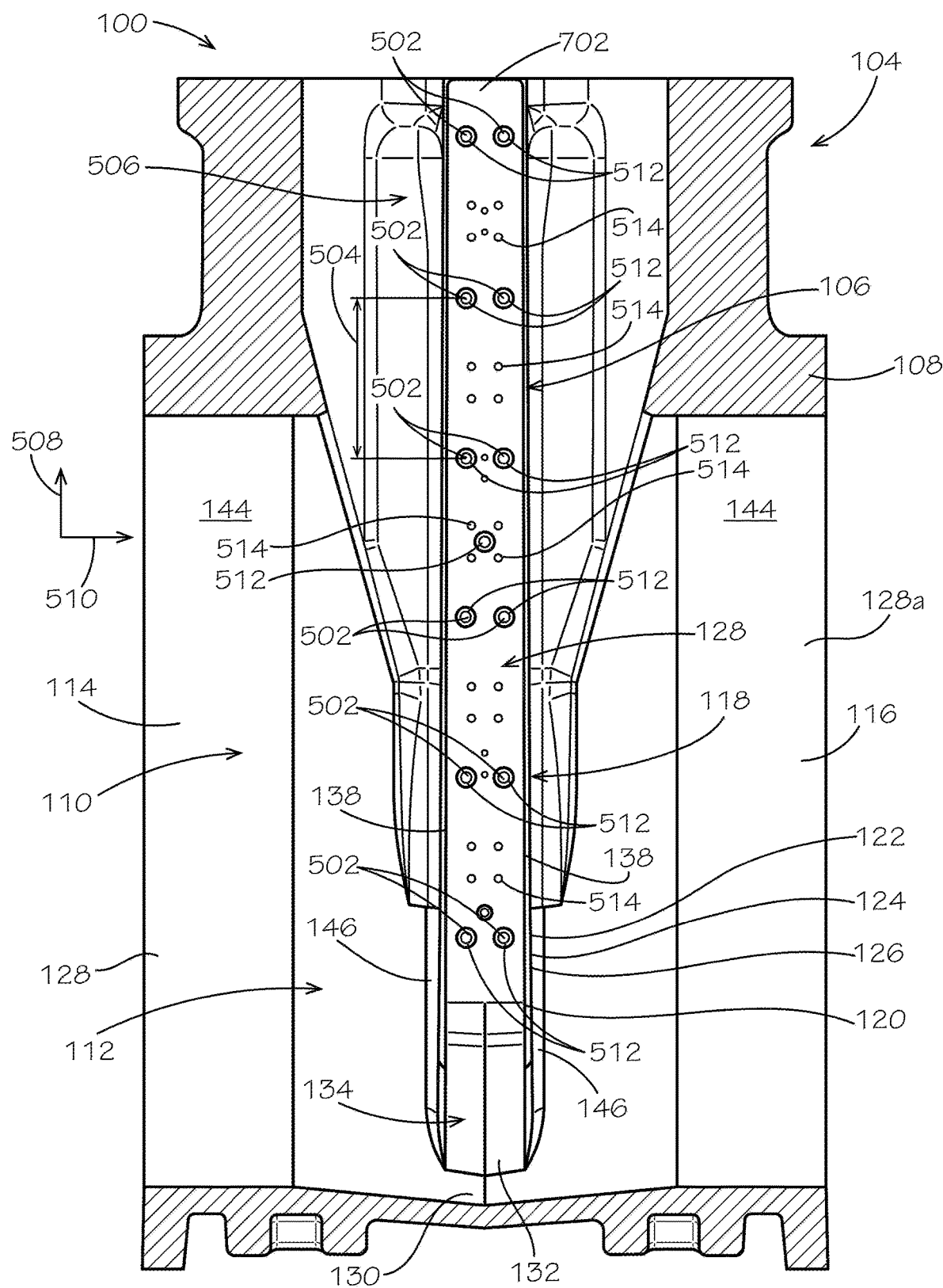
FIG. 5 is a cross-sectional orthogonal view of a valve body of the gate valve with the gate removed to show a guide assembly and taken along line 3-3 of FIG. 1.

FIG. 5 is a cross-sectional orthogonal view of gate valve 500 showing gate 102 (FIG. 1) removed and taken along line 3-3 of FIG. 1. Guide tracks 120 are shown inside the lateral sides 128 of the valve body 108. A liquid epoxy, resin, and/or adhesive 124 is injected in the gap 126 between the temporary boundary 138 and cured. In some aspects, various fasteners 502 (in the present aspect illustrated as bolts) can be installed through the track 120 (and/or the adjustment plate 702 and/or base plate 704, shown in FIG. 7) to couple the guide assembly 118 to the guide channel 106 of the valve body 108. In various aspects, the fasteners 502 can be offset from one another by an offset distance 504 in a fastener pattern 506 wherein the fasteners 502 are equally spaced in a first direction 508 corresponding to the lateral sides 128 and/or a second direction 510 corresponding to a direction of fluid flow through the valve port 110 (e.g., from the inlet 114 to the outlet 116) when gate 102 is in the open configuration 104. The first direction 508 can be substantially perpendicular to the second direction 510, such that the lateral sides 128a,b of the valve body 108 are substantially perpendicular to the base 134 of the valve body 108. In aspects, the offset distance 504 can be equal, as measured between the fasteners 502 in the first direction 508, but oriented such that the fasteners 502 are not aligned in the second direction 510.

Figure 7:
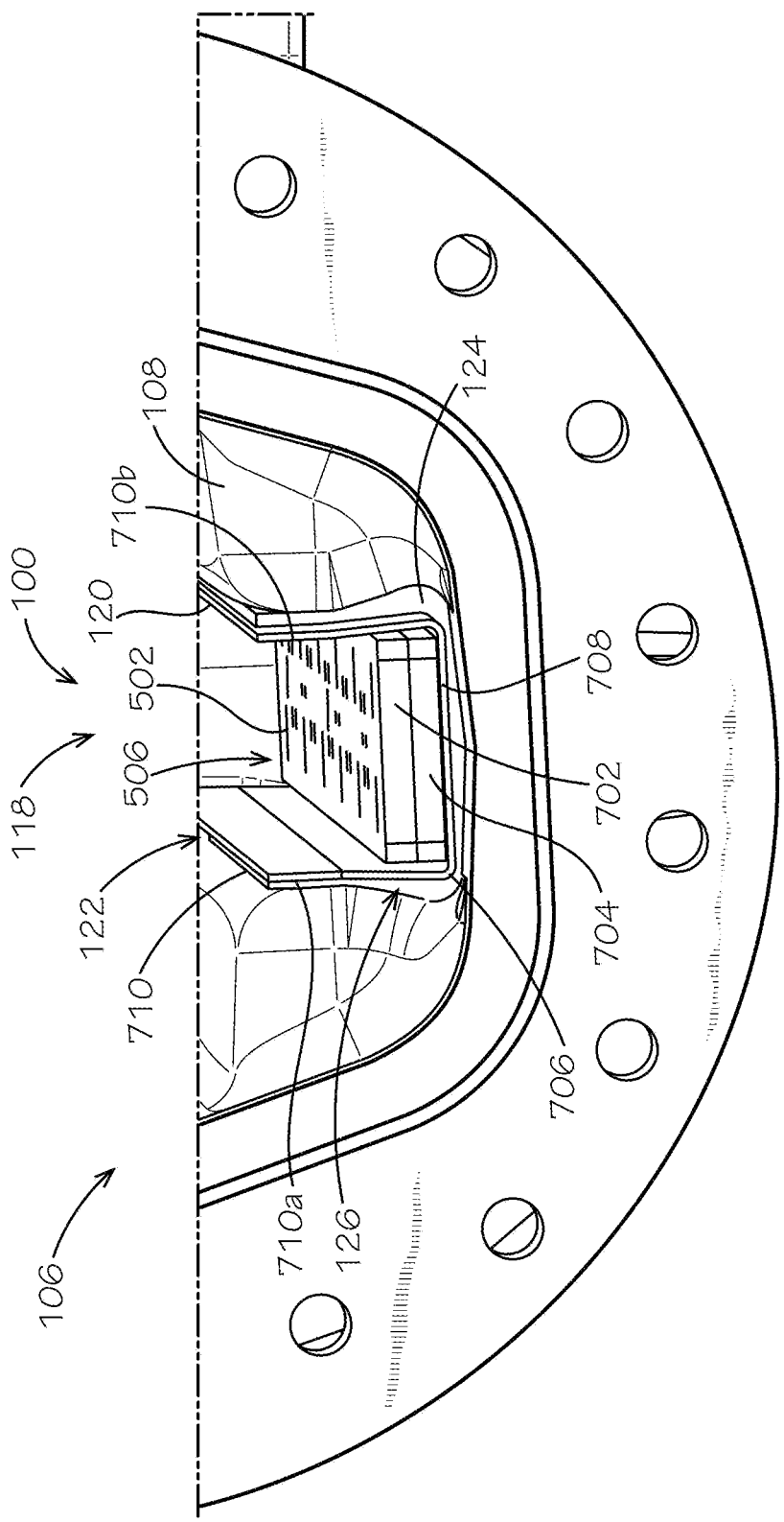
FIG. 7 is a top perspective view of the guide assembly installed within the guide channel of the gate valve of FIG. 1.
Figure 8:
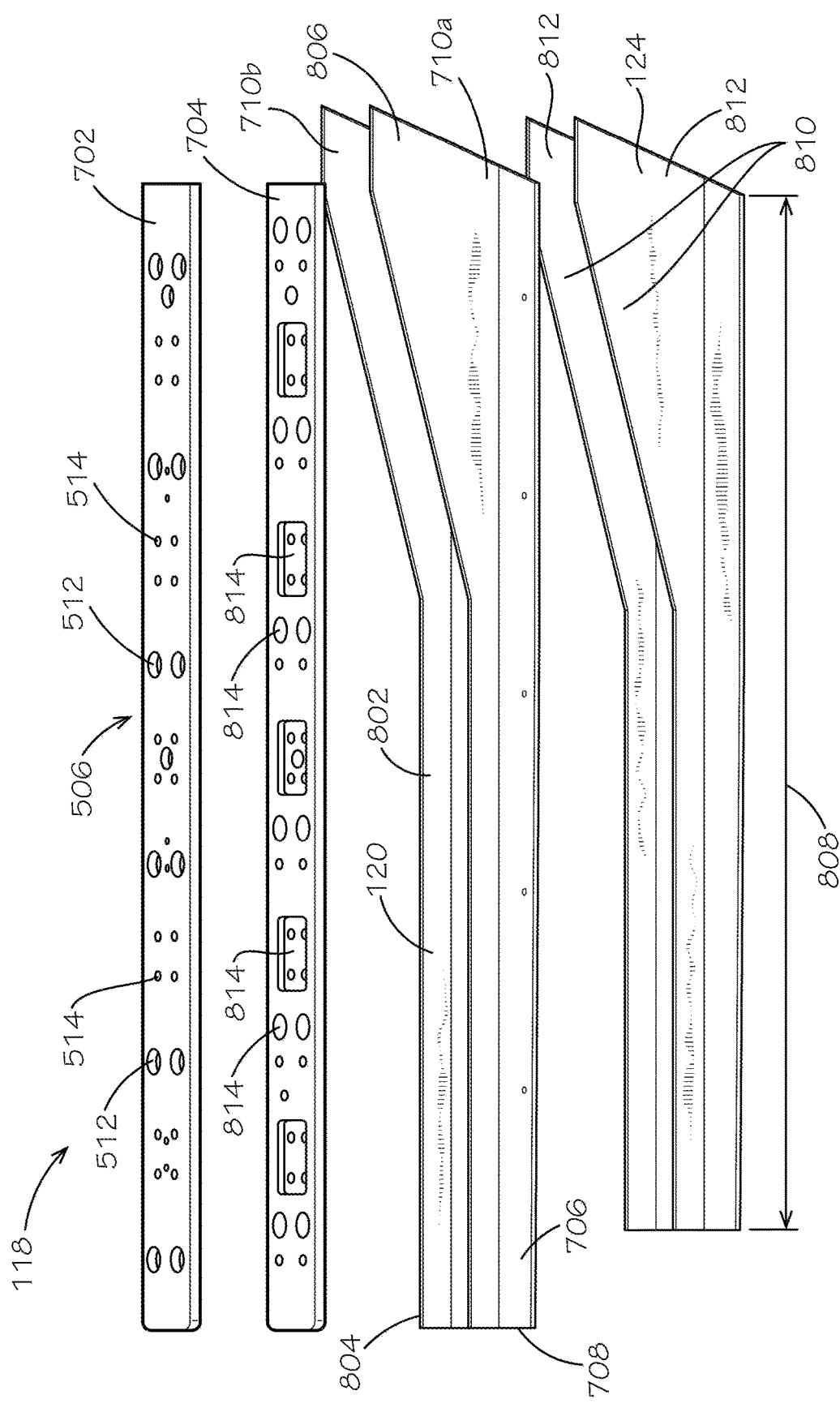
FIG. 8 is an exploded side perspective view of the guide assembly.

As shown in FIGS. 5 and 7-8, the guide tracks 120, adjustment plate 702, and/or base plate 704 can comprise fastener openings 512 that can have a countersunk head in the adjustment plate 702 and/or pass through the guide tracks 120, the adjustment plate 702, and/or base plate 704. That is, fastener openings 512 are configured to facilitate operator adjustment of adjustment plate 702 in the guide channel 106. Additional openings 514 can facilitate connecting adjustment plate 702 relative to base plate 704, valve body 108, and/or guide tracks 120.

Figure 6:
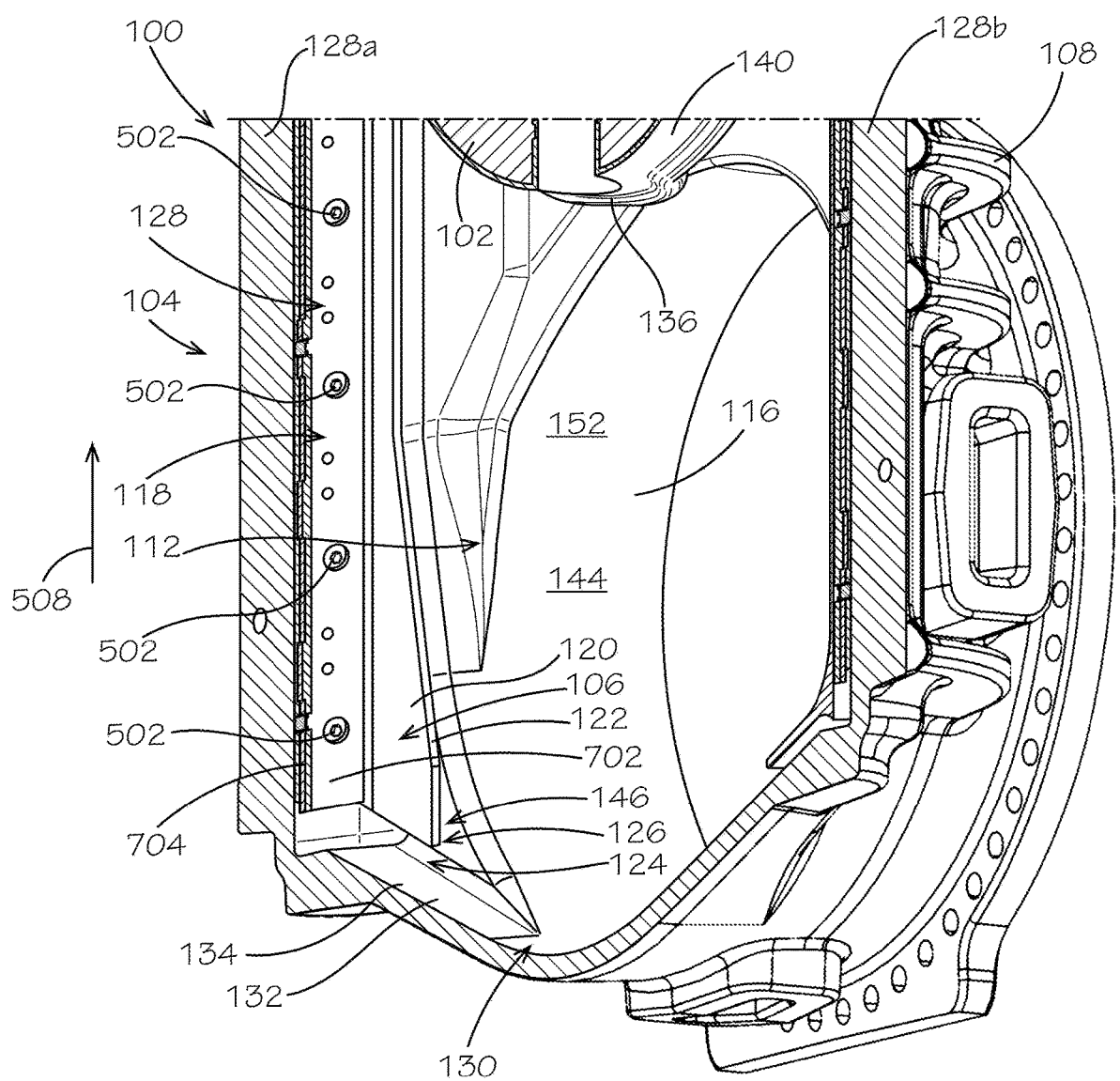
FIG. 6 is a side perspective cross-sectional view taken along line 6-6 of FIG. 1, showing the guide assembly within a guide channel of the gate valve.

FIG. 6 is a side perspective cross-sectional view taken along line 6-6 of FIG. 1, showing the guide assembly 118 within the gate valve 100. Track 120 is installed within guide channel 106 of the valve body 108, and fasteners 502 run in the first direction 508 through the guide assembly 118 to couple the track 120, adjustment plate 702, and/or base plate 704 within the valve body 108 and facilitate adjustment of the guide assembly 118 when the gate 102 is installed within the guide assembly 118.

FIG. 7 is a top perspective view of the guide assembly 118 installed within a valve the same as or similar to valve 100 of FIG. 1. The guide assembly 118 comprises adhesive 124 cured to the track 120, which supports and partially surrounds the adjustment plate 702 and the base plate 704. The track 120 is a U-shaped rail 706 comprising a transverse section 708 interposed between two opposing sections 710a, b. When the gate 102 (FIG. 1) is in the closed configuration, a portion of the gate 102 can be captured between the two opposing sections 710a,b of the U-shaped rail 706 to contain the gate 102 within the guide channel 106. The base plate 704 and/or adjustment plate 702 can support the gate 102 as it moves or translates between the open configuration 104 (FIG. 1) and the closed configuration 202 (FIG. 2). The base plate 704 and/or the adjustment plate 702 can be modified, adjusted, and/or manufactured to ensure a seal is formed and structurally stabilized between the gate 102 and the guide assembly 118 in the guide channel 106. Moreover, the adhesive 124 in the gap 126 is cured to maintain the structural support and/or fluid-tight seal between the track 120 of the guide assembly 118 and the guide channel 106 of the valve body 108. In various aspects, the gap 126 between the guide channel 106 and the track 120 can be equal to or between about ¼ and ½ inches.

FIG. 8 is an exploded side perspective view of guide assembly 118. The guide assembly 118 comprises a hardened epoxy layer or dried adhesive 124 that couples the track 120 of the guide assembly 118 to the guide channel 106 (FIG. 1) of the valve body 108 (FIG. 1). The track 802 (the same as or similar to track 120) can have the rail 706 that can be U-shaped, C-shaped, or comprise another beam cross-sectional shape. For example, the rail 706 can have a web or transverse section 708 and a pair of opposed flanges, shown as opposing sections 710a,b, arranged in a U, C, I, H, or J cross-sectional configuration. The track 802 and/or rail 706 can have a different sized opposing sections 710a,b (e.g., flanges) on a first side 804 (e.g., near the bonnet 148, FIG. 1) than a second side 806, e.g., near the base 134 (FIG. 1) or the base seat 132 (FIG. 1) of the valve body 108. In some aspects, a transverse length of the opposing sections 710a,b at the first side 804 can be less than the transverse length of the opposing sections 710a,b at the second side 806. The increased transverse length of the opposing sections 710a,b near the base seat 132 can provide enhanced support to the gate 102 (FIG. 1) when in the closed configuration 202 (FIG. 2) to ensure a fluid-tight seal, e.g., in a large diameter pipe and/or at elevated pressures.

Guide assembly 118 can define an axial length 808 extending along the track 802 (or the adhesive 124 between the track 802 and the guide channel 106 shown in FIG. 1) in the lateral sides 128a,b (FIG. 1) of the valve body 108, e.g., extending along the first direction 508 (FIG. 5). In various aspects, the valve body 108 and/or guide assembly 118 can be configured for a diameter of the inlet 114 and or outlet 116 (FIG. 1) can be equal to or greater than 50 inches, such that the axial length 808 can be between 50 inches and 75 inches, specifically between 55 and 70 inches, and more specifically between 60 and 65 inches.

As shown the first side 804 is less than the second side 806, because the second side 806 of each track 802 comprises a tapered portion 810 that extends outward from the transverse section 708 of the track 802 at the second side 806, near the bottom of the guide channel 106. The tapered portion 810 extends outward from the transverse section 708 and inward toward the flow channel 112 to match an increasing depth of the guide channel 106 at the bottom semicircle formed at the bottom of gate 102 and/or guide channel 106. Below a diameter of gate 102 extending from a first lateral side 126a to a second lateral side 126b (FIG. 6) of valve body 108, the gate 102 slides within a guide channel 106 that is coupled to the tapered portion 801 extending into the flow channel 112 to facilitated sealing the valve body 108 with a circular gate 102. As shown, the track 802 can have a toe 812 that extends substantially downward from the tapered portion 810 to the base seat 132 on a traverse side 130 (FIG. 6).

Figure 9:
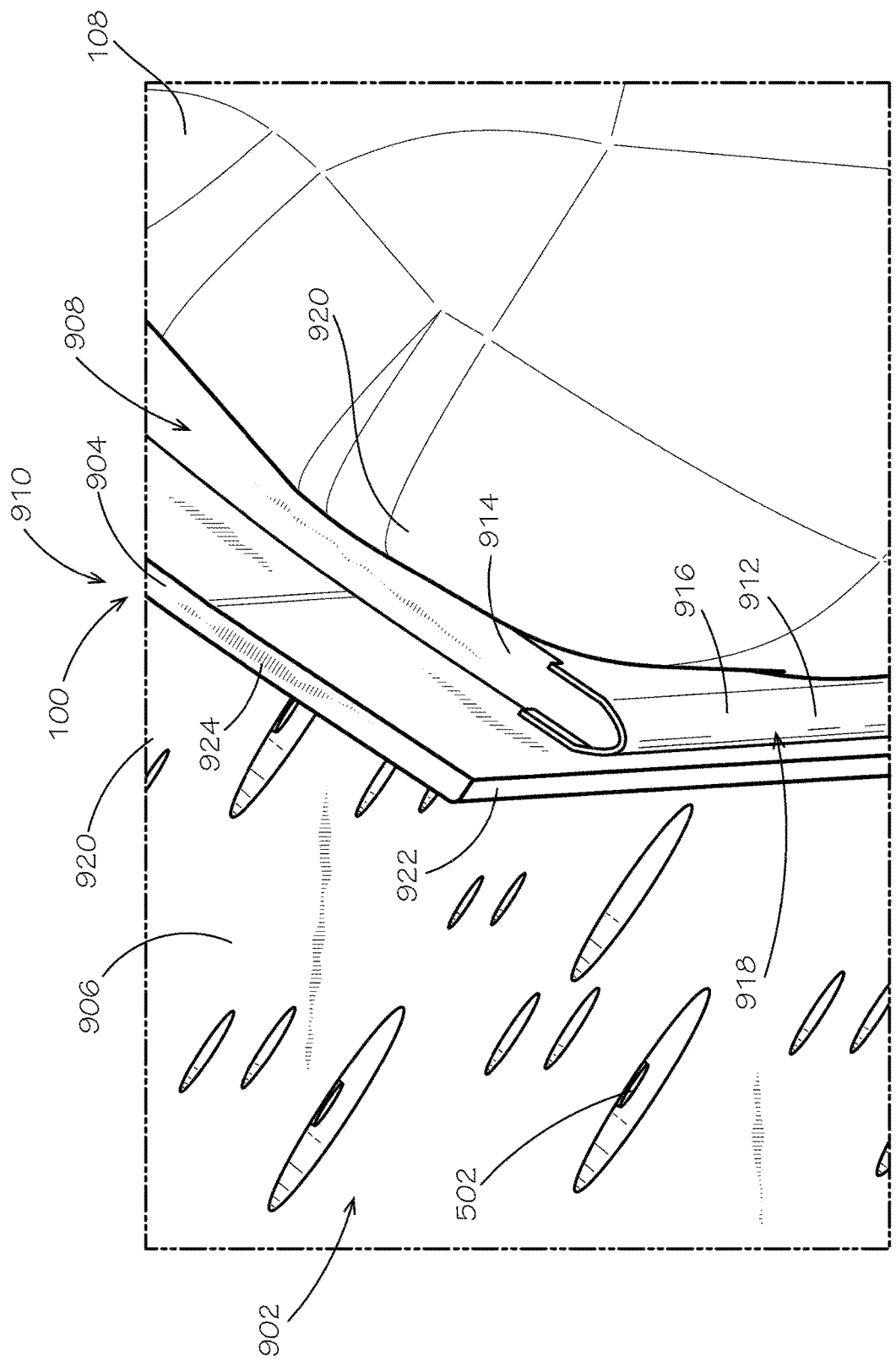
FIG. 9 is an inner perspective view of the guide assembly showing a lattice mesh in the gate valve of FIG. 1.

FIG. 9 shows a guide assembly 902 within a gate valve 100, e.g., the same as or similar to valve 100. The guide assembly 902 comprises a track 904 partially surrounding an adjustment plate 906 and forming a gap 908 within a guide channel 910. A folded barrier, shown as lattice mesh 912, can be installed within the gap 908 between the guide channel 910 and an outer part of the track 904 of the guide assembly 902 to capture a cured resin or adhesive, shown as cured epoxy 914. The lattice mesh 912 (e.g., barrier 122, FIG. 1) can be bent and/or wedged between components of the track 904 and/or a guide assembly 902 of valve 100 to form a cured boundary 916. In some aspects, layers of the lattice mesh 912 can be joined or layered to create a multi-level boundary 916 or barrier (e.g., barrier 122). In other aspects, the lattice mesh 912 can comprise a single lattice mesh 912 that can be painted with the uncured epoxy 914 and/or adhesive 124 (FIG. 1) and allowed to cure to form the boundary 916. When the boundary 916 is cured, the gap 908 can be injected with additional uncured epoxy 914 and cured to form the cured epoxy 914 to secure and couple guide assembly 902 within guide channel 910 and/or adjust track 904 supporting a gate 102 (FIG. 1) to maintain a fluid-tight seal, e.g., with large diameter gate valves 100 and/or in elevated pressure environments.

In the first stage, shown in FIG. 9, a composite boundary 916 can be formed by painting uncured epoxy 914 on the lattice mesh 912 and curing the epoxy 914. That is, by painting the uncured epoxy 914 on a wetted end 918 of the boundary 916 and/or lattice mesh 912, the cured epoxy 914 protects the lattice mesh 912 and/or boundary 916 from exposure to fluid in the channel and prevents corrosion and/or erosion of the lattice mesh 912 and/or boundary.

In various aspects, the cured epoxy 914 can create a liquid resin-proof (or epoxy-proof) boundary 916 in the gap 908 around a base 920 and/or sides 922 of the track 904. A top 924 of track 904 can be kept open to the environment, and uncured liquid epoxy 914, e.g., epoxy, can be poured behind track 904 in the gap 908 on the base 134 (FIG. 1) and/or sides 922 of track 904. In this way, stage one can comprise forming a boundary 916 around the base 134 and/or the sides 922 of the track 904. The boundary 916 can be created by folding a strip of the lattice mesh 912, such as a wire cloth, a stainless-steel lattice, or other lattice and/or mesh. The boundary 916 (e.g., lattice mesh 912) can be folded in half and wedged between the track 904 and the guide assembly 902 of the valve body 108. In various aspects, the lattice mesh 912 can be a continuous part or can comprise a series of smaller lattice mesh components that can be joined together in step one with the application of the liquid adhesive 124 and/or uncured epoxy 914 that is then allowed to cure.

In some aspects, an operator can choose a boundary 916 with an appropriate size of metal mesh. That is, the operator can select a boundary 916 based on various factors that comprise the wire or lattice sizes, the surface tension of the epoxy 914 (e.g., epoxy or resin), and/or the density of the weave of the mesh. Appropriate selection facilitates the manipulation of the boundary 916 into the gaps 908 and ensures the formation of a liquid-tight boundary 916 when the epoxy 914 in stage one is cured.

Stage one can further comprise different techniques of applying the epoxy 914 to the boundary 916. The epoxy 914 can be painted onto the boundary 916 and/or permitted to soak into the boundary 916 prior to curing. Once the epoxy 914 is cured, the composite boundary 916 with cured epoxy 914 can provide a boundary 916 that captures liquid epoxy 914 within the gap 908 defined between the track 904 and the guide assembly 902 of the valve body 108. That is, applying the epoxy 914 to the boundary 916, such as a weaved metallic cloth, and allowing the epoxy 914 to cure forms a sufficiently strong boundary to capture the liquid epoxy 914 that is injected into the gap 908 in stage two. The boundary 916 and epoxy 914 can form a composite boundary 916 that prevents the uncured liquid epoxy 914 from relocating itself during the curing process in stage two.

As shown in FIG. 9, the lattice mesh 912 and/or boundary 916 may not extend the full length of the guide assembly 902. For example, the guide assembly 902 can extend past a shoulder 920 of the valve body 108, such that the lattice mesh 912 only extends along the track 904 up to a level of the shoulder 920 of the guide channel 910 within the valve body 108. In various aspects, the lattice mesh 912 does not extend along the full length of the track 904 and/or the guide channel 910, but terminates at the beginning of the shoulder 920 so that uncured adhesive or epoxy 914 is captured within the gaps 908. That is, by not completely filling the gap 908, the epoxy 914 is captured and retained within the gap 908.

Figure 10:
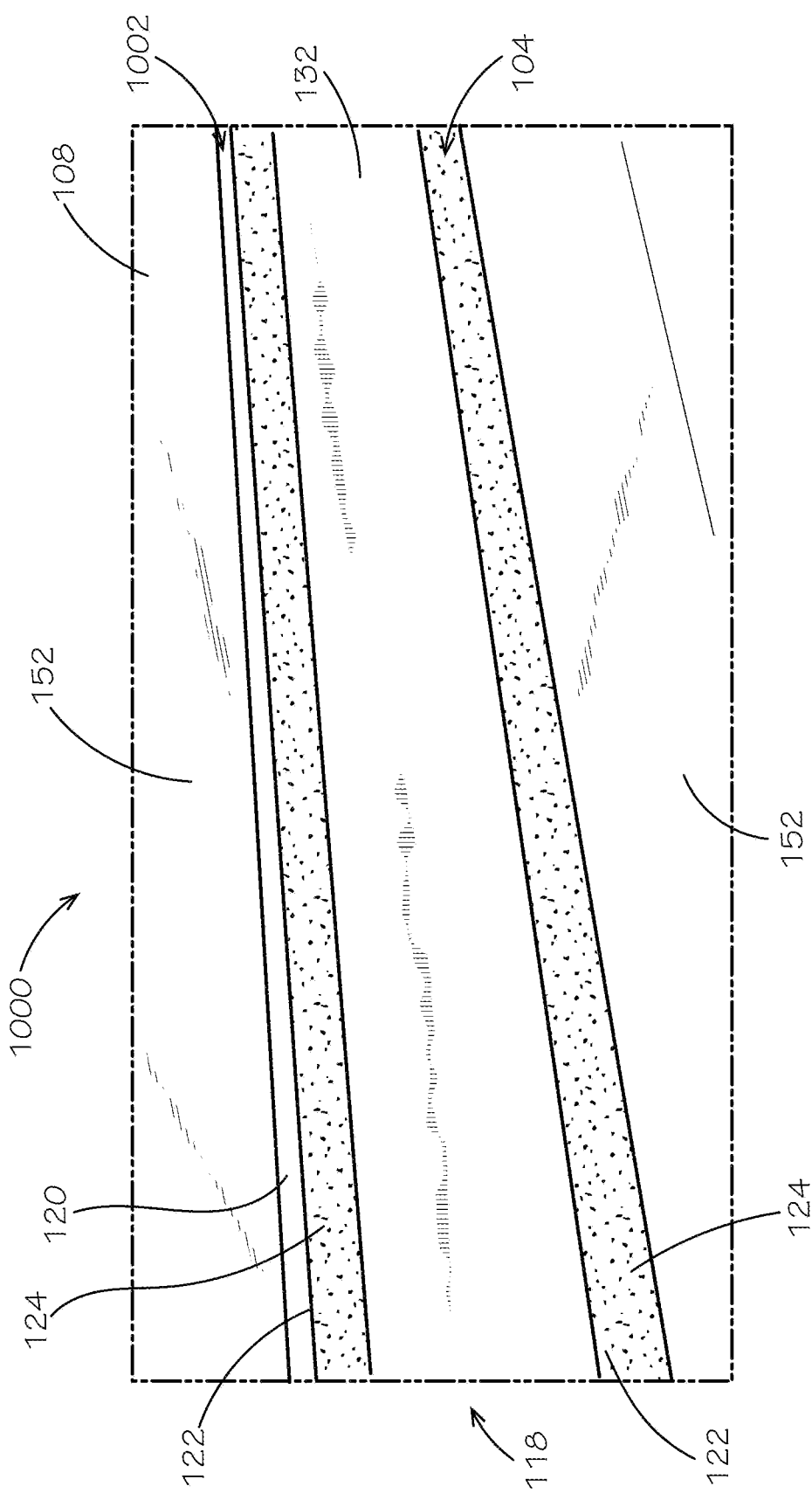
FIG. 10 illustrates a joint having a barrier cured over the lattice mesh of FIG. 9.

FIG. 10 illustrates a completed joint 1000 (e.g., the guide assembly 118 with the track 120 and/or the base seat 132 on valve 100, shown in FIG. 1). The joint 1000 can comprise a first side barrier 1002 on a first side of the track 120 and/or the base seat 132. The joint 1000 can further comprise a second side barrier 1004 on the second or opposite side of joint 1000 (e.g., the opposite side of the track 120 and/or base seat 132). The side barriers 1004 and/or 1006 can comprise the cured adhesive 124 that is applied to and then cured over the barrier 122, e.g., as illustrated in FIG. 9. In various aspects, the side barrier 122 can further comprise a cured, dried, and/or hardened adhesive 124 behind the temporary boundary 138 (FIG. 1) to form a pressure-tight seal between the valve body 108 and the track 120. The barrier 122 and/or the cured adhesive 124 can comprise non-corrosive materials, such that the cured adhesive 124 can be part of the wetted surface 152. For example, the barrier 122 can be stainless steel and/or entirely captured within an outer layer of a non-corrosive cured adhesive 124. The barrier 122 can be a lattice mesh 912 (FIG. 9), such as wire cloth, such as a stainless-steel wire cloth mesh, and the cured adhesive 124 can be a thermoset epoxy. The thermoset epoxy of the adhesive 124 can form the wetted surface 152 that covers the wire barrier 122, and the wire barrier 122 is not wetted because the thermoset epoxy surrounds it.

Figure 11:
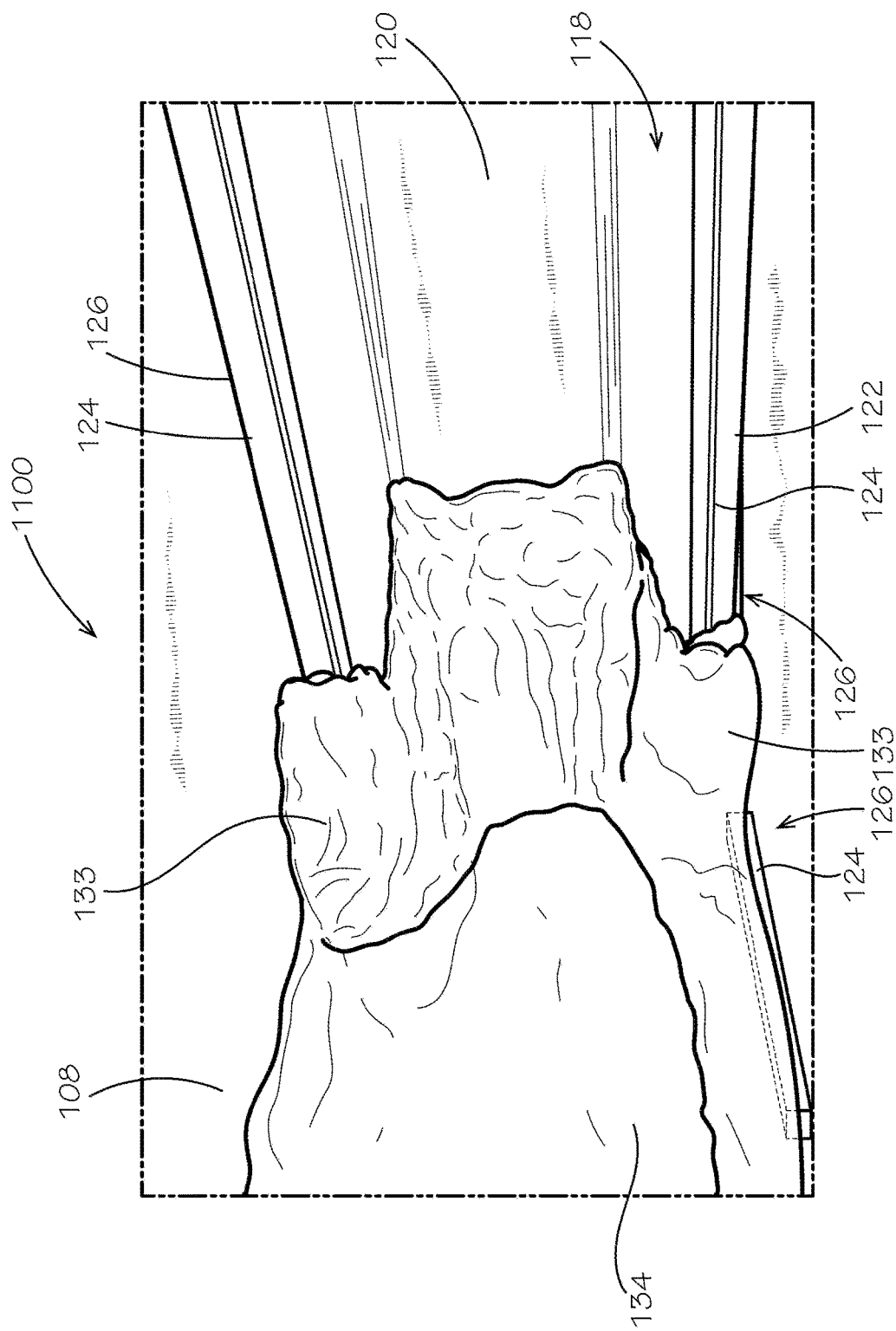
FIG. 11 is a terminus of the guide assembly showing a bottom seat of the gate valve comprising a malleable sealing compound.
Figure 12:
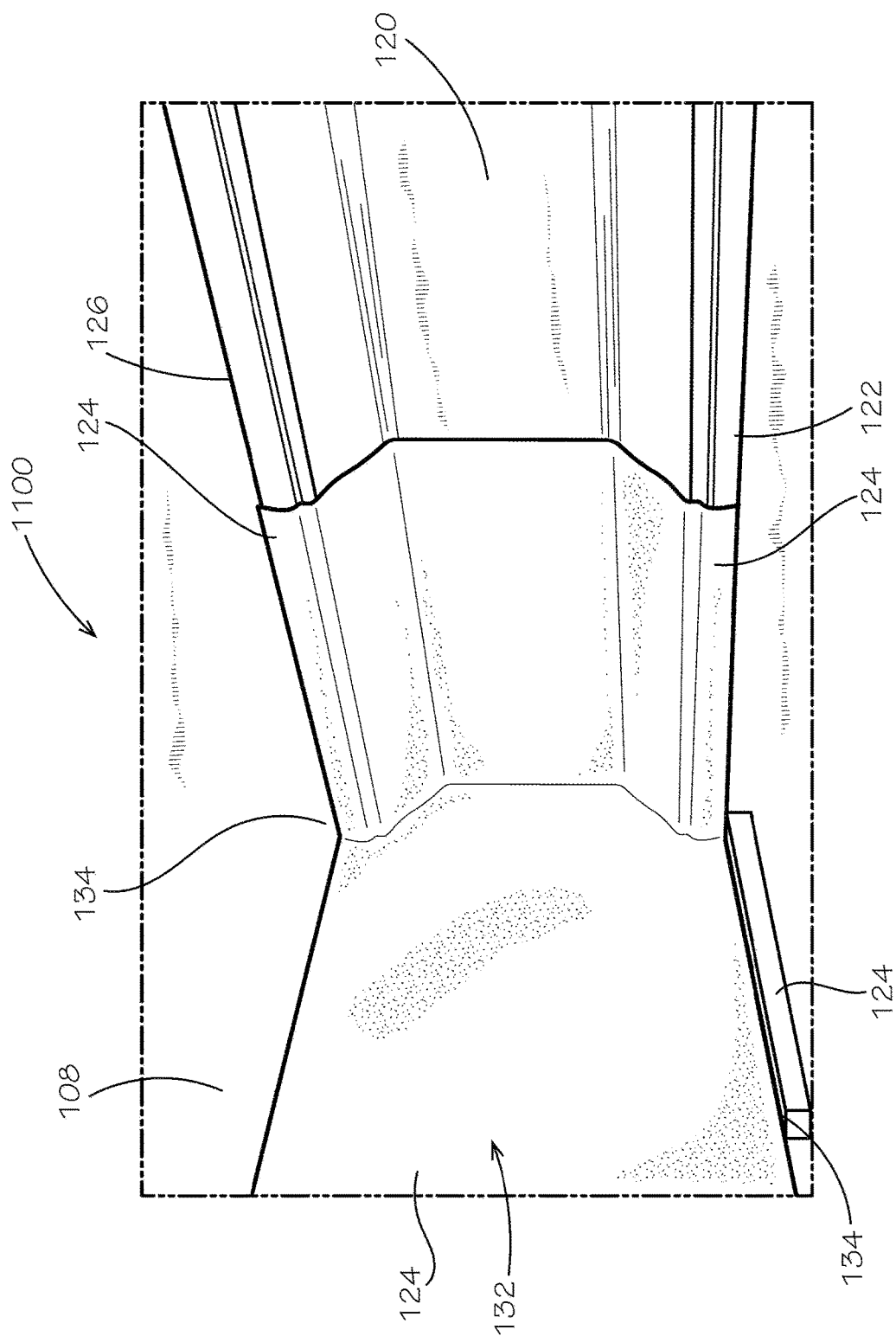
FIG. 12 is the terminus of the guide assembly of FIG. 11 showing the malleable sealing compound removed from the bottom seat of the gate valve.

FIGS. 11 and 12 show a terminus of the guide assembly 118 within the base seat 132 of a gate valve 1100. FIG. 11 shows a first step of forming a sealing compound shown as malleable sealing material 133 in the track 120 and FIG. 12 shows how the malleable sealing material 133 can form a cured adhesive 124 barrier. In various aspects, the malleable sealing material 133 can be removed and the cured adhesive can mesh lattice barrier 122 that has been folded over between the steel track 120 and the cast-iron valve body 108. A bed or the base 134 can be formed from a bed of plumber's putty, such as the malleable sealing material 133, an uncured resin, epoxy, and/or adhesive 124. In some aspects, a small floor of wet adhesive 124 can be poured behind the track 120 to form a barrier or the base seat 132. For example, plumber's putty can form a water-tight seal, but without adequate support, the putty may not withstand the pressures/forces withstood by a cured epoxy or resin, which can be poured behind the track 120. The malleable sealing material 133 can include epoxy (e.g., approximately an inch high) behind the track 120 to support the bed of plumber's putty to form a fluid-tight seal. When the epoxy is cured, the epoxy can form the structural support for the putty that forms the fluid-tight seal. In various embodiments, the epoxy floor may be poured and/or cured and can be removed and/or remain in place. In some aspects, the epoxy and/or putty can remain on the floor to reduce risk of damage to the valve body 100 during removal.

This configuration can create the base seat 132 with a structural epoxy-tight barrier/floor on the base 134 formed from the malleable sealing material 133 and the cured adhesive 124. The base seat 132 can comprise the malleable sealing material 133 in the track 120, and the cured adhesive 124 in the base 134 can be placed downstream from the gate 102 (FIG. 1) when the gate 102 is in the closed configuration 202 (FIG. 2). The cured adhesive 124 can be injected in the gap 126 of the track 120 and/or in a slot or behind the track 120 to form the fluid-tight seal in the base seat 132.

For example, the method can comprise forming a barrier 122 with the malleable sealing material 133 (e.g., epoxy and putty as shown in FIG. 11) on or behind track 120. For example, the malleable sealing material 133 can be applied within or on the base 134 of valve body 108 to form barrier 122 and/or a step of cured adhesive 124 extending across the transverse side 130 of the base 134. Barrier 122 and/or step 1202 define a unique and customizable base seat 132 within guide assembly 118 of valve body 108. For example, the barrier 122 and/or step 1202 can comprise a slot or step within base 134 to support the sealing putty, malleable sealing material 133, and/or the cured adhesive 124. The barrier 122 can define the base seat 132 in the guide assembly 118 and comprise a slot between the track 120 and the guide assembly 118. For example, a curable adhesive 124 can be injected into the slot between the track 120 and the guide assembly 118. Similarly, the curable adhesive 124 can be customized to fit within a temporary slot of the malleable sealing material 133 and cured to form the step 1202 that seals gate 102. The curable adhesive 124 can be cured to provide a pressure-tight barrier 122.

FIG. 12 shows the terminus of guide assembly 118 with the malleable sealing material 133 removed. For example, the malleable sealing material 133 can be removed from within the base seat 132 of a gate valve 1100 by a putty knife or other tool, once the cured adhesive 124 barrier is formed. Stated differently, FIG. 11 shows the malleable sealing material 133 to form a mold for the uncured compound, and FIG. 12 shows the malleable sealing material 133 removed to expose the cured adhesive 124.

Figure 13:
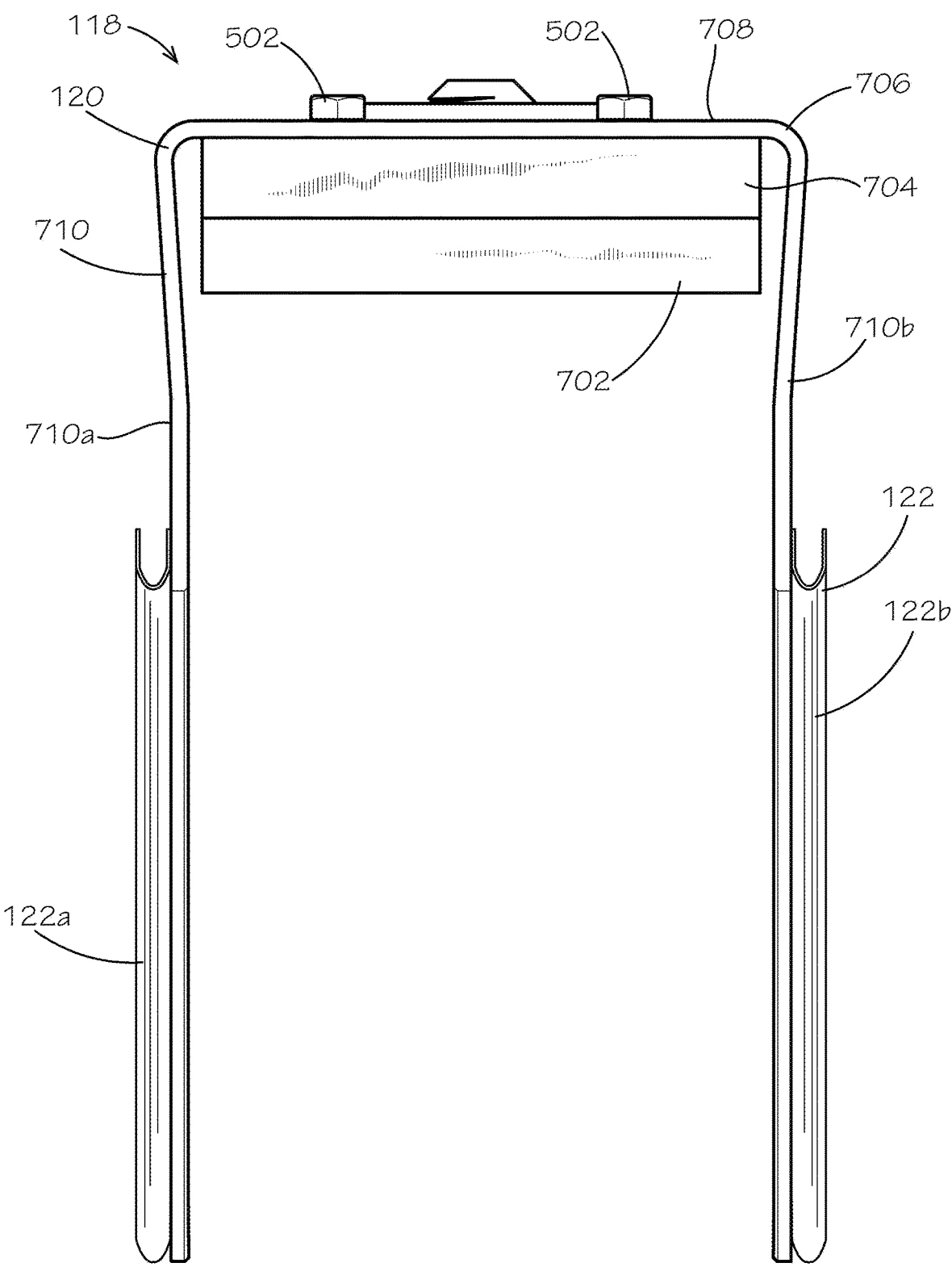
FIG. 13 is a top view of the guide assembly with the adjustment plate and the base plate showing the relative positions of the barriers.

FIG. 13 shows a top view of the customizable guide assembly 118 configured to facilitate in situ adjustments to the gate 102 and secure a fluid-tight seal following installation of the guide assembly 118. Fasteners 502, such as bolts, extend through the track 120 and/or rail 706 to secure a base plate 704 against and within the track 120. The adjustment plate 702 can be fastened against the base plate 704 and/or the track 120. Opposed flanges (e.g., sections 710a,b) are coupled against barrier 122. As shown, each opposing section 710a and 710b is coupled to a corresponding barrier 122a and 122b, respectively.

Figure 14:
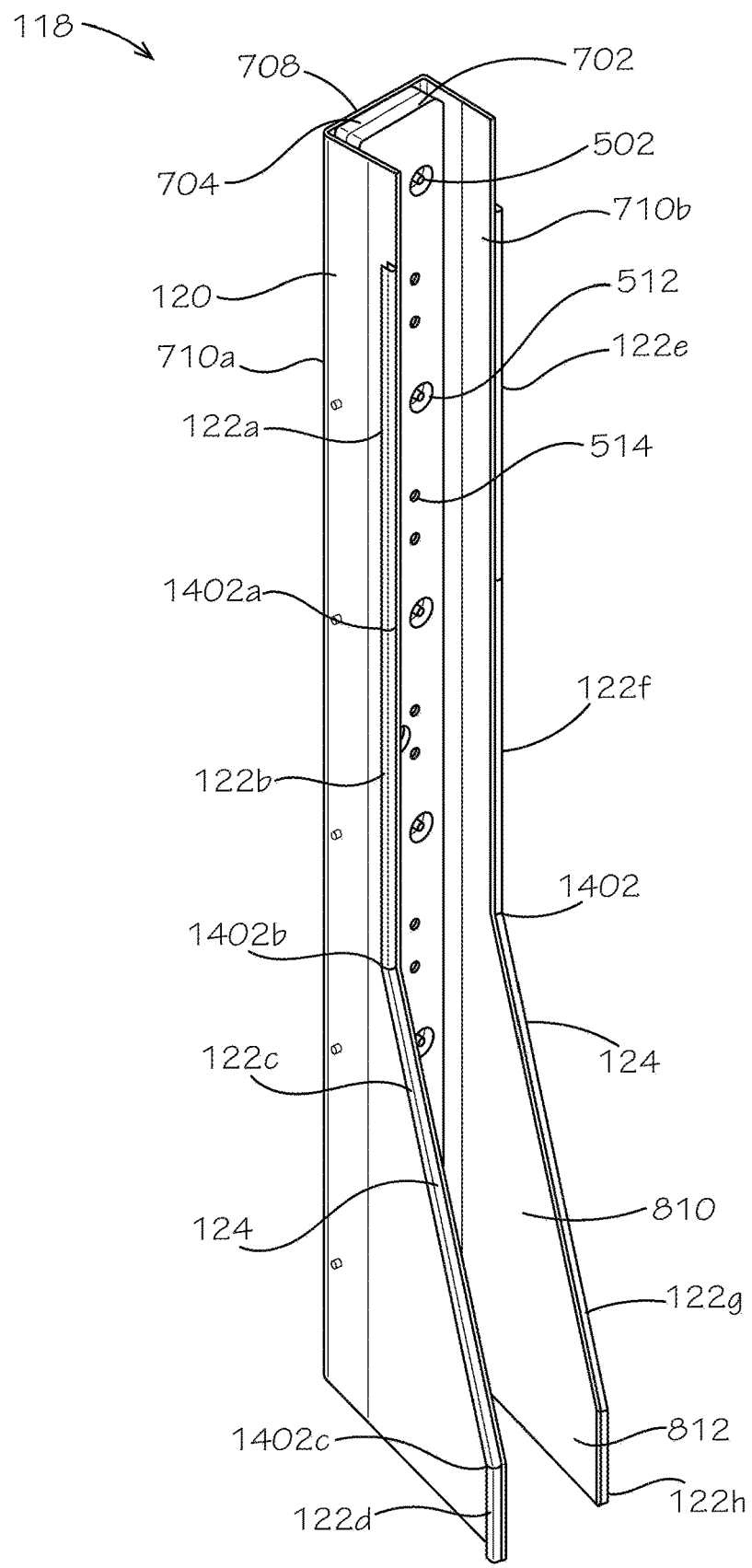
FIG. 14 is a side perspective view of the guide assembly with the adjustment plate and the base plate showing the relative positions of the barriers.

FIG. 14 shows the guide assembly 118 comprising two opposite barriers 122a and 122b. That is, FIG. 14 is another perspective of the guide assembly 118 shown in FIG. 13. As shown, the barrier 122 can comprise a series or plurality of barriers stacked one on top of another at the ends to create a barrier 122 that extends along the edge of track 120. For example, on a first side 710a the barrier 122 can comprise the stacked configuration of a first barrier 122a, adjacent a second barrier 122b, adjacent a third barrier 122c, and a fourth barrier 122d. That is the completed barrier 122 on the first side 710a can comprise a series of barriers (122a-d) stacked on top of one another and affixed with adhesive 124 to form the complete barrier 122.

Similarly, the opposite side 710b can comprise a plurality of barriers 122e-h that collectively are adhered onto track 120 and collectively form barrier 122 on the opposite side 710b. That is, the barrier 122f and 122g can be joined together at a joint 1402 that couples each part of the composite barrier 122. For example, as shown, the first side 710a comprises three joints 1402 to construct the complete barrier 122. The barrier comprises joint 1402a, joining barrier 122a to barrier 122b, joint 1402b, which joins barrier 122b to barrier 122c, and joint 1402c, which joins barrier 122c to barrier 122d. This configuration is not intended to be limiting. The number of barriers 122a-h on either side can be greater than, less than, or equal to the number shown. Similarly, the number of joints 1402 can be more than, less than, or equal to the number shown in FIG. 14. In some aspects, the number of barriers 122a-h and/or joints 1402 may be greater on one side (e.g., first side 710a) than the opposing side (e.g., side 710b). This facilitates in situ installation and adjustment of barrier 122a-h and customization of the installation for guide assembly 118.

FIG. 14 also shows that in some aspects, the composite barrier 122 (that is, the barrier 122 formed from several barriers 122a-h and joints 1402a-c) on either side 710a,b may not necessarily extend the full length of track 120. The top section of track 120 may not include barrier 122 because extending barrier 122 past the shoulder 920 (FIG. 9) may result in adhesive 124 that overfills and cures within the valve body 108 and/or guide channel 106 (FIG. 1).

With reference to FIGS. 1-14, a method of manufacturing valve 100 can comprise fitting track 120 within guide assembly 118 for the gate 102 in the valve body 108. The guide assembly 118 can define gap 126 between track 120 and valve body 108. A temporary boundary can be created in gap 126 between guide assembly 118 and track 120. A curable resin or adhesive 124 can be inserted within gap 126, and the curable adhesive 124 can be captured within gap 126 by the temporary boundary 138.

The method can comprise machining track 120 before curing the curable adhesive 124 within gap 126. A pressure differential, either a positive pressure or a vacuum pressure, can be applied to the curable adhesive 124 while curing the curable adhesive 124. The method can comprise forming barrier 122 with a malleable sealing compound (e.g., adhesive 124) in track 120. Barrier 122 can define the base seat 132 within guide assembly 118 of valve body 108 and can comprise a slot between track 120 and guide assembly 118. A curable adhesive 124 can be injected into the slot between track 120 and guide assembly 118, and the curable adhesive 124 can be cured to provide a pressure-tight barrier 122.

In some aspects, the curable resin can be a polymer epoxy adhesive 124. The curable adhesive 124 can be inserted within the gap 126 by inserting the barrier 122 and/or through the application of a positive pressure on the curable adhesive 124 while curing the curable adhesive 124 under the positive pressure. The method can comprise curing the polymer epoxy adhesive 124 into a covalently thermoset bonded epoxy adhesive 124.

A method of aligning track 120 in the wettable surface 152 of valve 100 can comprise inserting track 120 into guide assembly 118 of valve 100 to form gap 126 between track 120 and guide assembly 118. A temporary boundary 138 can be formed in the gap 126 with adhesive 124 bonded on the barrier 122, and the gap 126 can be filled between the track 120, the guide assembly 118, and the barrier 122.

In various aspects, the barrier 122 can be formed in the gap 126 with the adhesive 124 bonded on the barrier 122. The method can comprise painting the temporary boundary 138 with the uncured adhesive 124 and then curing the adhesive 124. The gap 126 between the track 120 and the guide assembly 118 can be filled with a curable epoxy adhesive 124. Positive pressure can be applied to the epoxy adhesive 124 while curing the epoxy adhesive 124 into a covalently bonded thermoset epoxy adhesive 124.

The method can comprise forming the barrier 122 with a malleable sealing compound (e.g., adhesive 124) in the track 120. The barrier 122 can define the base seat 132 in the guide assembly 118 and can comprise the slot between the track 120 and the guide assembly 118. The curable adhesive 124 can be injected into the slot between the track 120 and the guide assembly 118, and the curable adhesive 124 can be cured to provide a pressure-tight barrier 122.

This description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B," as used herein means "only A, only B, or both A and B"; while the phrase "one of A and B" means "A or B."

Unless the context clearly dictates otherwise, the term "monolithic" in the description of a component means that the component is formed as a singular component that constitutes a single material without joints or seams.

To simplify the description of various elements disclosed herein, the conventions of "left," "right," "front," "rear," "top," "base," "upper," "lower," "inside," "outside,"

"inboard," "outboard," "horizontal," and/or "vertical" may be referenced. Unless stated otherwise, "front" describes that end of the seat nearest to and occupied by a user of a seat; "rear" is that end of the seat that is opposite or distal the front; "left" is that which is to the left of or facing left from a person sitting in the seat and facing towards the front; and "right" is that which is to the right of or facing right from that same person while sitting in the seat and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

One should note that conditional language, such as, among others, "can," "could," "might," or "may," unless expressly stated otherwise, or otherwise understood within the context as used, is generally intended to convey that certain aspects include, while other aspects do not include, certain features, elements and/or steps. Thus, such conditional language is not generally intended to imply that features, elements, and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
    a valve body defining a valve port and a guide channel;
    a gate configured to slide along the guide channel between an open configuration and a closed configuration; and
    a guide assembly comprising:
        a track mounted in the guide channel, a gap defined between the guide channel and the track,
        a barrier covering the gap, and
        a cured adhesive within the gap;
    wherein:
        the barrier and the cured adhesive comprise non-corrosive materials, and
        the barrier is a stainless-steel wire mesh lattice, and the cured adhesive is a thermoset epoxy, and wherein the thermoset epoxy forms a wetted surface that covers the wire mesh lattice, and the wire mesh lattice is not wetted when fluid is in the valve port.

2. The valve of claim 1, wherein a base seat comprises a first adhesive cured in the gap formed by the track and a second cured adhesive in the base seat downstream from the gate when the gate is closed.

3. The valve of claim 1, wherein the gate is a cast stainless steel plate embedded in rubber.

4. The valve of claim 1, wherein a width of the gap between the guide channel and the track is equal to or between ¼ inches and ½ inches.

5. The valve of claim 1, wherein the track is a U-shaped rail comprising a transverse section interposed between two lateral side sections, and a portion of the gate is captured between the two lateral side sections of the U-shaped rail.

6. The valve of claim 1, further comprising a bonnet capturing a stem and the gate; wherein the bonnet is configured to maintain a fluid-tight seal with the valve body.

7. The valve of claim 1, wherein the barrier comprises a U shape that captures the cured adhesive to form a boundary.

8. The valve of claim 1, wherein the barrier comprises a plurality of mesh lattices overlapped and joined end-to-end in the gap to form a boundary.

\* \* \* \* \*